(12) United States Patent
Kubota et al.

(10) Patent No.: US 10,691,322 B2
(45) Date of Patent: Jun. 23, 2020

(54) DISPLAY CONTROL DEVICE AND STORAGE MEDIUM

(71) Applicant: SONY CORPORATION, Tokyo (JP)

(72) Inventors: Yoshiyasu Kubota, Kanagawa (JP); Keishi Tsuchiya, Tokyo (JP)

(73) Assignee: SONY CORPORATION, Tokyo (JP)

( * ) Notice: Subject to any disclaimer, the term of this patent is extended or adjusted under 35 U.S.C. 154(b) by 636 days.

(21) Appl. No.: 14/489,914

(22) Filed: Sep. 18, 2014

(65) Prior Publication Data

US 2015/0100915 A1    Apr. 9, 2015

(30) Foreign Application Priority Data

Oct. 4, 2013   (JP) ................................. 2013-209272

(51) Int. Cl.
*G06F 3/048* (2013.01)
*G06F 3/0485* (2013.01)

(52) U.S. Cl.
CPC ................................. *G06F 3/0485* (2013.01)

(58) Field of Classification Search
CPC .................................................... G06F 3/0485
See application file for complete search history.

(56) References Cited

U.S. PATENT DOCUMENTS

| 2011/0122078 A1* | 5/2011 | Kasahara | G06F 3/0488 345/173 |
| 2012/0086722 A1* | 4/2012 | Miyazawa | G06F 3/0485 345/619 |
| 2012/0272181 A1* | 10/2012 | Rogers | G06F 3/0482 715/784 |
| 2012/0272185 A1* | 10/2012 | Dodson | H04N 21/4828 715/810 |
| 2013/0100051 A1* | 4/2013 | Mochizuki | G06F 3/0483 345/173 |
| 2015/0205474 A1* | 7/2015 | Donelan | G06F 3/0483 715/784 |

FOREIGN PATENT DOCUMENTS

JP    2004-054589 A    2/2004

* cited by examiner

*Primary Examiner* — Anil N Kumar
(74) *Attorney, Agent, or Firm* — Chip Law Group

(57) ABSTRACT

There is provided a display control device including a detection unit configured to detect that an information input or output screen is scrolled together with scrolling of a plurality of content regions, the information input or output screen being related to a content region provided adjacent to a single content region among the plurality of content regions arranged and displayed in line on a display screen, and configured to detect that the information input or output screen has reached a prescribed position on the display screen, and a display control unit configured to, when the detection unit has detected that the information input or output screen has reached the prescribed position, perform display control in a manner that the information input or output screen is maintained at the prescribed position, and configured to perform display control in a manner that scrolling of the plurality of content regions continues.

7 Claims, 16 Drawing Sheets

FIG. 3

| TOPIC NUMBER | LINK TO CONTENT | IN-PROCESS FLAG |
|---|---|---|
| 1 | #0001 | 0 |
| 2 | #0050 | 0 |
| 3 | #0080 | 0 |
| 4 | #0120 | 0 |
| 5 | #0138 | 0 |
| 6 | #1024 | 0 |
| ... | ... | ... |

FIG. 13

| VIDEO NUMBER | LINK TO CONTENT | IN-PROCESS FLAG |
|---|---|---|
| 1 | #0001 | 0 |
| 2 | #0050 | 0 |
| 3 | #0080 | 0 |
| 4 | #0120 | 0 |
| 5 | #0138 | 0 |
| 6 | #1024 | 0 |
| ... | ... | ... |

FIG. 16
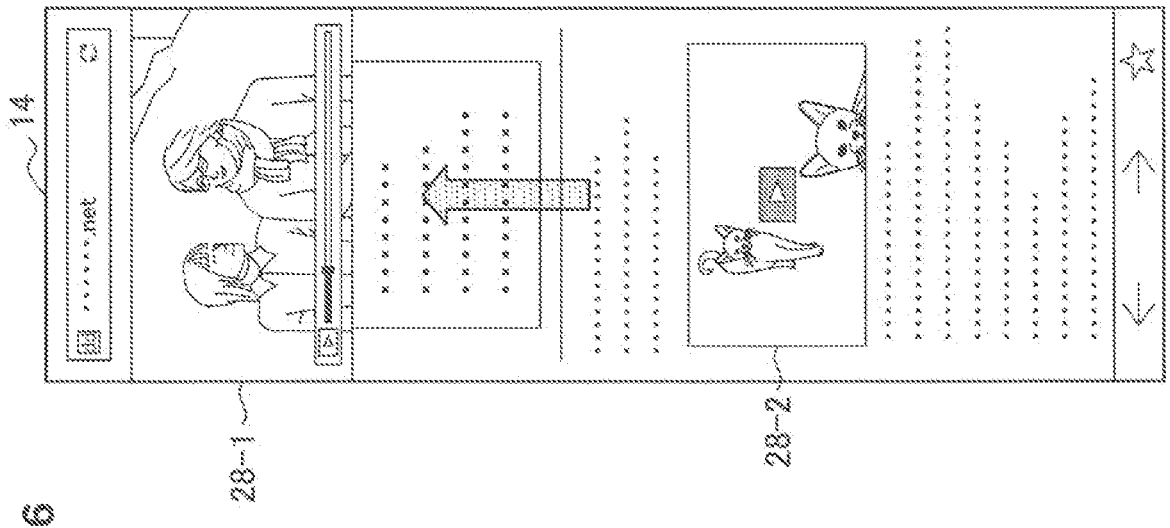
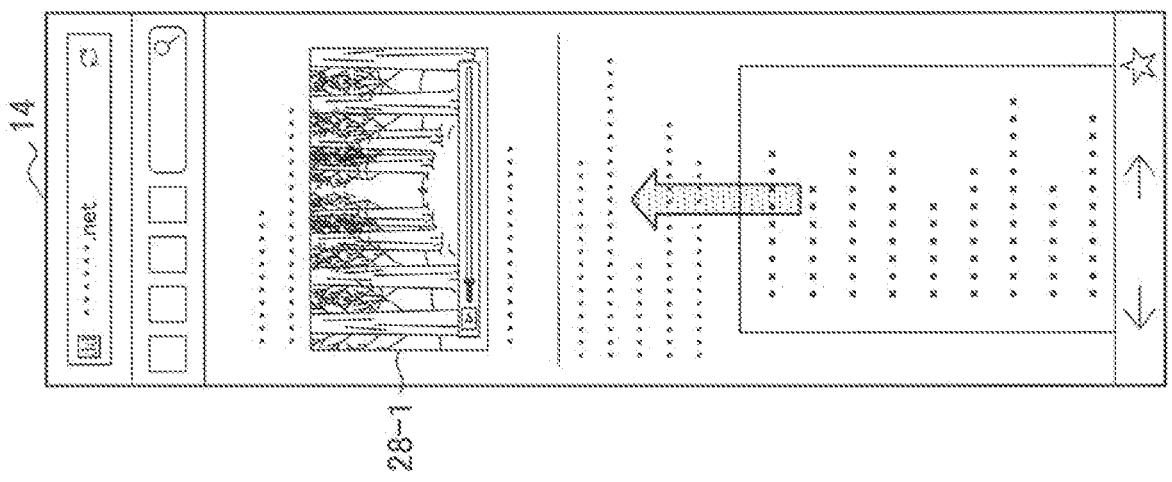

DISPLAY CONTROL DEVICE AND STORAGE MEDIUM

CROSS REFERENCE TO RELATED APPLICATIONS

This application claims the benefit of Japanese Priority Patent Application JP 2013-209272 filed Oct. 4, 2013, the entire contents of which are incorporated herein by reference.

BACKGROUND

The present disclosure relates to a display control device and a storage medium.

Recently, electronic equipment has been downsized, a space in which to place a hardware keyboard and a ten key has been omitted, and contact input detection has been used as an input interface, the contact input detection being capable of operation input by directly touching an icon, graphics and the like which are displayed on a display screen. With regard to such input interface for performing operation input by directly touching an icon and the like on the display screen, JP 2004-54589A proposes a method of improving input efficiency without interfering in display screen, for example.

SUMMARY

However, JP 2004-54589A does not refer to efficient display control when scrolling the display screen.

For example, in a case where many comments (hereinafter also referred to as posts) posted by a contributor, many headlines of news articles, or the like are arranged in line on the display screen, a user can view a portion which is not displayed on the display screen by performing scrolling operation to move a display region. It is also possible to display a graphical user interface (GUI) through which the user taps a post and headline of interest among the posts and the headlines to display details of the post and the headline of interest and through which diverse operation can be performed on the posts and the headlines. Such GUI (information input/output screen) may be displayed in association with a target post or a target headline in a region where a display region of the target post or a target article is enlarged, because a transitional motion takes some time if the display screen with state transition is displayed. Here, when the user performs scrolling operation, a GUI in the middle of operation moves together with the target post/headline and then the GUI is scrolled out.

If the GUI in the middle of operation is out of the display screen, the user may forget that the operation is still not done. In addition, in order to restart the operation, it takes an effort to return to a position where the GUI in the middle of operation has been displayed by scrolling back.

The present disclosure proposes a display control device and storage medium capable of maintaining displaying a screen in the middle of information input or output when the screen is scrolled.

According to an embodiment of the present disclosure, there is provided a display control device including a detection unit configured to detect that an information input or output screen is scrolled together with scrolling of a plurality of content regions, the information input or output screen being related to a content region provided adjacent to a single content region among the plurality of content regions arranged and displayed in line on a display screen, and configured to detect that the information input or output screen has reached a prescribed position on the display screen, and a display control unit configured to, when the detection unit has detected that the information input or output screen has reached the prescribed position, perform display control in a manner that the information input or output screen is maintained at the prescribed position, and configured to perform display control in a manner that scrolling of the plurality of content regions continues.

According to an embodiment of the present disclosure, there is provided a non-transitory computer-readable storage medium having a program stored therein, the program causing a computer to function as a detection unit configured to detect that an information input or output screen is scrolled together with scrolling of a plurality of content regions, the information input or output screen being related to a content region provided adjacent to a single content region among the plurality of content regions arranged and displayed in line on a display screen, and configured to detect that the information input or output screen has reached a prescribed position on the display screen, and a display control unit configured to, when the detection unit has detected that the information input or output screen has reached the prescribed position, perform display control in a manner that the information input or output screen is maintained at the prescribed position, and configured to perform display control in a manner that scrolling of the plurality of content regions continues.

As described above, according to the embodiments of the present disclosure, it is possible to maintain displaying a screen in the middle of information input or output when the screen is scrolled. Note that the present disclosure is not limited to the effect stated above and in addition to or in place of the effect stated above, may achieve any of the effects indicated in this specification or effects that can be understood from the specification.

BRIEF DESCRIPTION OF THE DRAWINGS

FIG. 3 is a diagram showing a database configuration of a content management DB according to the embodiment;

FIG. 13 is a diagram showing a configuration example of a video management database stored in a content management DB;

FIG. 16 is a display-transition diagram illustrating a display example of scrolling of an article including an in-process video.

DETAILED DESCRIPTION OF THE EMBODIMENT(S)

Figure 1:
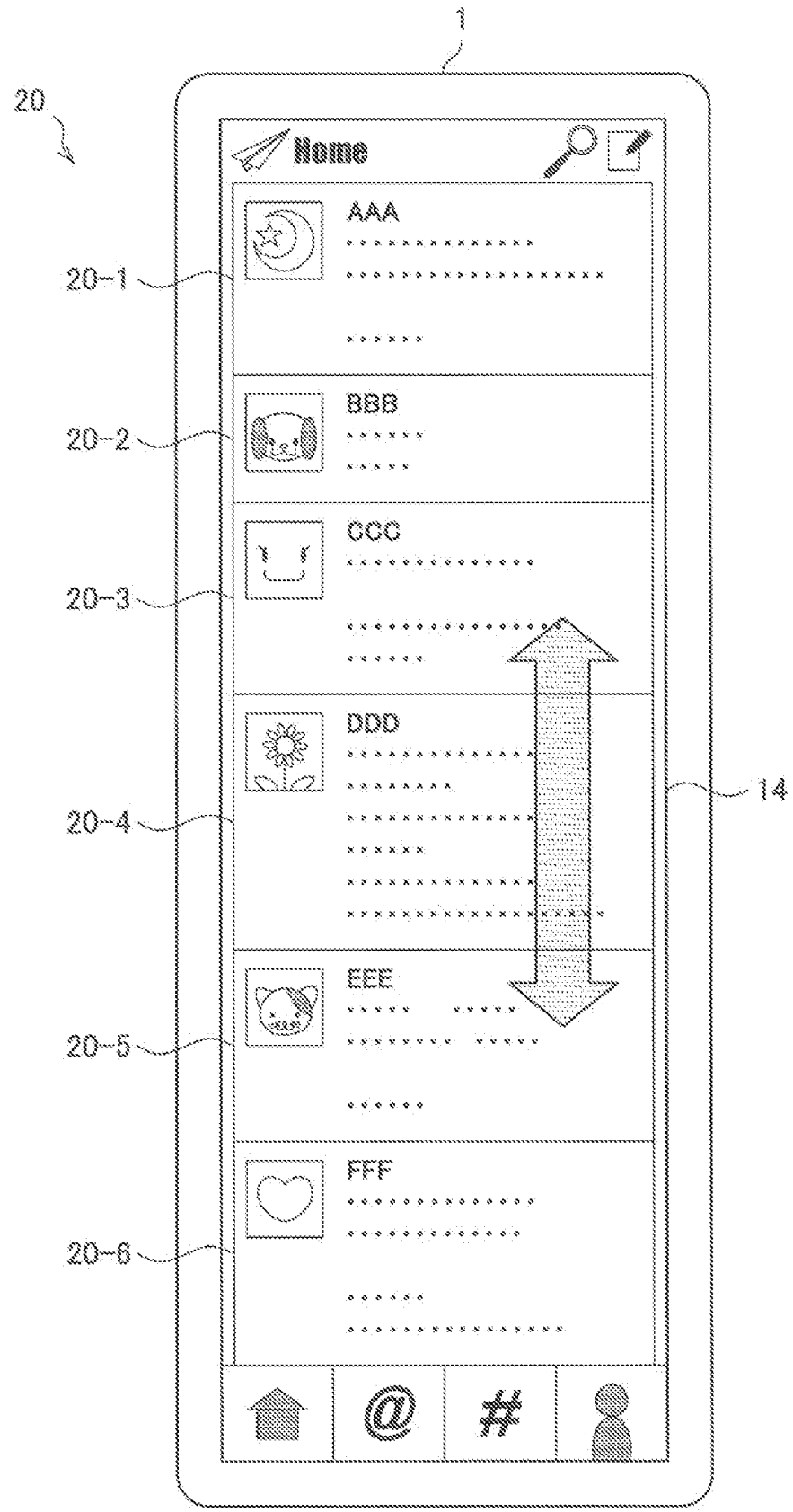
FIG. 1 is a diagram illustrating an outline of an information processing device according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description is given in the following order.
1. Outline of Information Processing Device according to Embodiment of Present Disclosure
2. Basic Configuration
3. Operation Processing
   3-1. Flag Management Processing
   3-2. Display Control Processing
   3-3. Display Control Processing of In-Process Topic
   3-4. Display Control of In-Process Video
4. Conclusion

1. OUTLINE OF INFORMATION PROCESSING DEVICE ACCORDING TO EMBODIMENT OF PRESENT DISCLOSURE

First, with reference to FIG. 1, an outline of an information processing device according to an embodiment of the present disclosure is explained. As shown in FIG. 1, a display unit 14 is provided at a surface of an information processing device 1 according to the present embodiment. Although an aspect ratio of the display unit 14 is not specifically limited, the aspect ratio may be 3:1.

In the display unit 14, a touch sensor that is an example of an operation input unit is stacked, and it becomes possible to detect user operation performed on a display screen.

In an example shown in FIG. 1, a plurality of content regions (topics 20-1 to 20-6) is arranged and displayed in line on the display unit 14. In such content regions, for example, posts (comments) posted through a network are displayed. As an example of social networking services (SNS) which have been popular recently, a service through which a plurality of users can post posts and share with other users has been known. As shown in FIG. 1, a plurality of posts is displayed vertically/horizontally in chronological order in such service. By scrolling the screen vertically/horizontally, the user can view other posts undisplayable in the display screen.

Moreover, in a content region which is arranged and displayed in line, not only posts provided by the SNS but also headlines of articles provided by RSS readers are displayed, for example. The RSS reader is an application by which RSSs used in news web sites or articles in blogs are acquired through a network so as to view the articles easily. As shown in FIG. 1, a plurality of headlines is arranged vertically/horizontally in chronological order in a list of the headlines of the articles. Accordingly, the user can view other headlines undisplayable in the display screen by scrolling the screen vertically/horizontally.

Among the topics 20 (example of the content regions) such as posts and headlines of articles which are arranged in line, when tapping/long pressing a topic which the user interested in, a GUI through which diverse operation can be performed on the selected topic is displayed. The GUI may be displayed on a region where a display region of the selected topic has been enlarged in association with the selected (target) topic. Examples of the diverse operation performed using such GUI include information input such as posting or replying comments, and information output such as playing a video and displaying detailed information.

BACKGROUND

When the user performs scrolling operation, a GUI in the middle of operation moves together with a target topic and the GUI in the middle of operation is scrolled out. If the GUI in the middle of operation is out of the display screen, the user may forget that the operation is still not done. In addition, in order to restart the operation, it takes an effort to return to a position where the GUI in the middle of operation has been displayed by scrolling back.

Accordingly, in the present embodiment, when the display screen where the content regions are arranged in line is scrolled, a screen in the middle of information input/output is controlled in a manner that the screen is maintained at a prescribed position in the display screen. In addition, in the present embodiment, it is also possible that the screen in the middle of information input/output is maintained at the prescribed position in the display screen together with a target content region. In this way, together with an information input/output screen, a content region in the middle of operation is maintained in a display screen even if the display screen is scrolled. Accordingly, the user does not forget that there is the content region in the middle of operation, and the operation can be immediately restarted.

In addition, in the present embodiment, it is also possible to reduce an effort of the operation by displaying the information input/output screen in an enlarged region in which the target content region has been enlarged without transiting the display screen. The outline of the information processing device according to the embodiment of the present disclosure has been described so far. Next, with reference to FIG. 2, a basic configuration of an information processing device according to an embodiment of the present disclosure is explained.

2. BASIC CONFIGURATION

Figure 2:
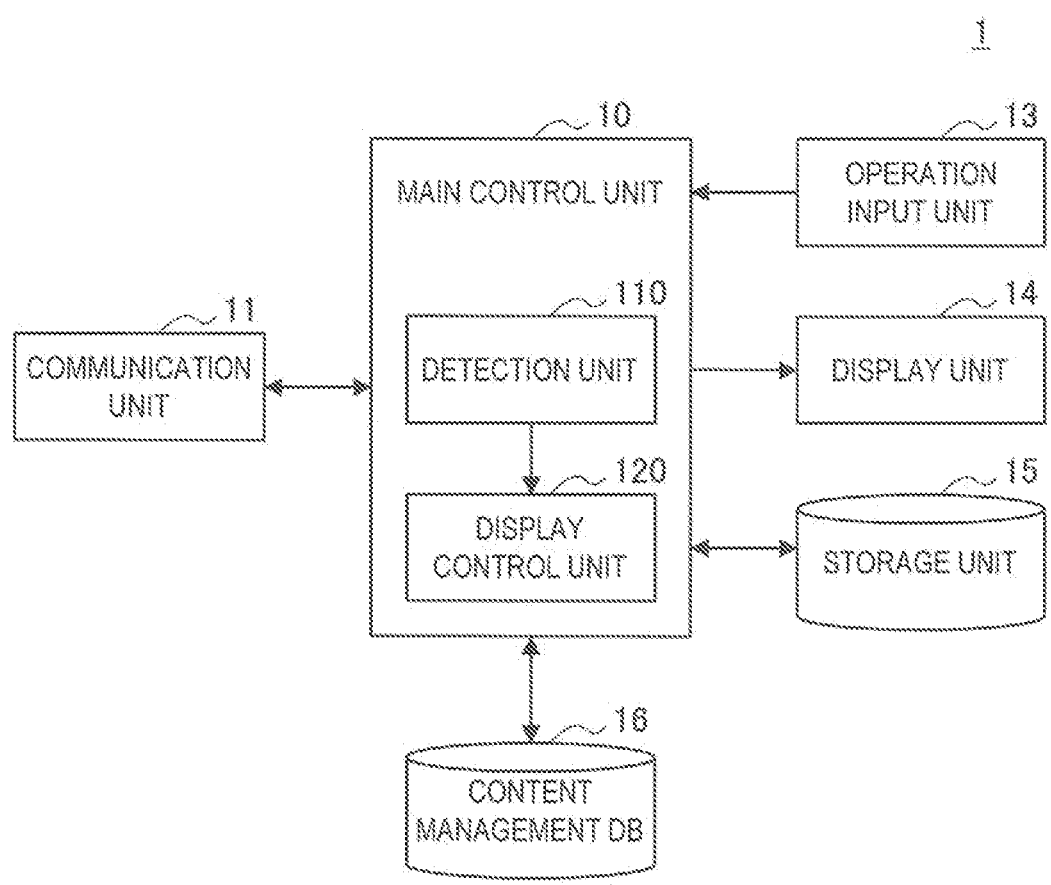
FIG. 2 is a block diagram showing a basic configuration of the information processing device according to the embodiment.

FIG. 2 is a block diagram showing a basic configuration of the information processing device 1 according to the present embodiment. As shown in FIG. 2, the information processing device 1 includes a main control unit 10, a communication unit 11, an operation input unit 13, a display unit 14, a storage unit 15, and a content management DB 16.

(Main Control Unit)

The main control unit 10 is made up of a microcontroller equipped with a central processing unit (CPU), read-only memory (ROM), random access memory (RAM), nonvolatile memory, and an interface unit, for example, and controls the respective components of the information processing device 1.

In addition, the main control unit 10 according to the present embodiment functions as a detection unit 110 and a display control unit 120. The detection unit 110 detects that an information input/output screen has reached a prescribed position in a display screen when the information input/output screen has been scrolled together with scrolling of a plurality of content region, the information input/output region being provided adjacent to a target content region among the plurality of content regions arranged and displayed in line on the display screen. Specifically, the detection unit 110 detects that the information input/output screen has reached at an edge of the display screen, for example.

As a detection result, the detection unit 110 notifies the display control unit 120 that the information input/output screen has reached the prescribed position in the display screen. Note that, in the present embodiment, the plurality of content region arranged in line in the display screen is managed by using certain identification numbers, and an "in-process flag" is set on a content region in the middle of information input/output. Accordingly, the detection unit 110 detects whether a topic on which the "in-process flag" has been set has reached the prescribed position.

The display control unit 120 performs control in a manner that various screens such as a menu screen, an operation screen, and an application screen are displayed on the display unit 14. In addition, when the screen in which the plurality of content regions are arranged in line is displayed, the display control unit 120 according to the present embodiment performs control in a manner that display positions of the plurality of content region is moved and scrolling display is performed in response to scrolling operation which is performed by the user and detected from the operation input unit 13.

In a case where any one of the plurality of content regions is selected, the display control unit 120 enlarges a display region of the content region and displays, in the enlarged region, an information input/output screen through which diverse operation can be performed on the content region. Such information input/output screen is scrolled together with the target content region.

In addition, when the display screen is scrolled, in a case where it is detected that the information input/output screen has reached the prescribed position in the display screen, the display control unit 120 according to the present embodiment performs control in a manner that the information input/output screen and the target content region are not scrolled out and are maintained at the prescribed position in the display screen. On the other hand, the display control unit 120 scrolls a normal content region which is not in the middle of information input/output, as normal. In this way, a screen in the middle of operation is maintained in a display screen. Accordingly, the user does not forget that there is the content region in the middle of operation, and the operation can be immediately restarted.

In addition, when information input in an information input screen maintained at the prescribe position ends, the display control unit 120 according to the present embodiment performs control in a manner that the display of the information input screen and the target content region is stopped (hidden). For example, when input of a post or a reply to a content region ends, the display control unit 120 performs control in a manner that an information input screen and a target content region is hidden.

In addition, when information output in the information output screen maintained at the prescribe position ends, the display control unit 120 performs control in a manner that the display of the information output screen and the target content region is stopped (hidden).

Alternatively, after the input/output of the information ends, the display control unit 120 may perform control in a manner that the display of the information input/output screen and the target content region is stopped after elapse of a certain time. Alternatively, even if the information input/output is still not done, the display control unit 120 performs control in a manner that the display of the information input/output screen and the target content region is stopped when the user instructs to end the information input/output.

(Communication Unit)

The communication unit 11 has functions of connecting with an external device in a wireless or wired manner and of transmitting and receiving data.

(Operation Input Unit)

The input unit 13 receives operation input performed by the user and outputs received input information to the main processing unit 10. The operation input unit 13 is achieved by a button, a switch, a touch sensor to receive operation input performed on the display screen, and the like.

(Display Unit)

The display unit 14 displays a certain display screen on the basis of control performed by the display control unit 120 in the main control unit 10. For example, the display unit 14 according to the present embodiment displays an e-commerce screen. In addition, the display unit 14 is achieved by a liquid crystal display (LCD), or an organic light-emitting diode (OLED), for example.

(Storage Unit)

The storage unit 15 stores a program and the like enabling the main control unit 10 to execute various processing.

(Content Management DB)

The content management DB 16 is a database for managing topics (example of the content regions) such as posts and headlines of articles which are arranged in line on the display screen by using identification numbers (also referred to as topic numbers). FIG. 3 shows a database configuration example of the content management DB 16 according to the embodiment.

As shown in FIG. 3, each topic is managed with a topic number, and is associated with a link to detailed contents of each topic and an in-process flag. In the present embodiment, such "in-process flag" is set on a topic to/from which information input/output is still not done (topic for which an information input/output screen is displayed).

The configuration of the information processing device a according to the present embodiment has been described so far. Next, with reference to flowcharts shown in FIGS. 4 to 6, operation processing of the information processing device 1 according to the present embodiment is explained in detail.

3. OPERATION PROCESSING

<3-1. Flag Management Processing>

Figure 4:
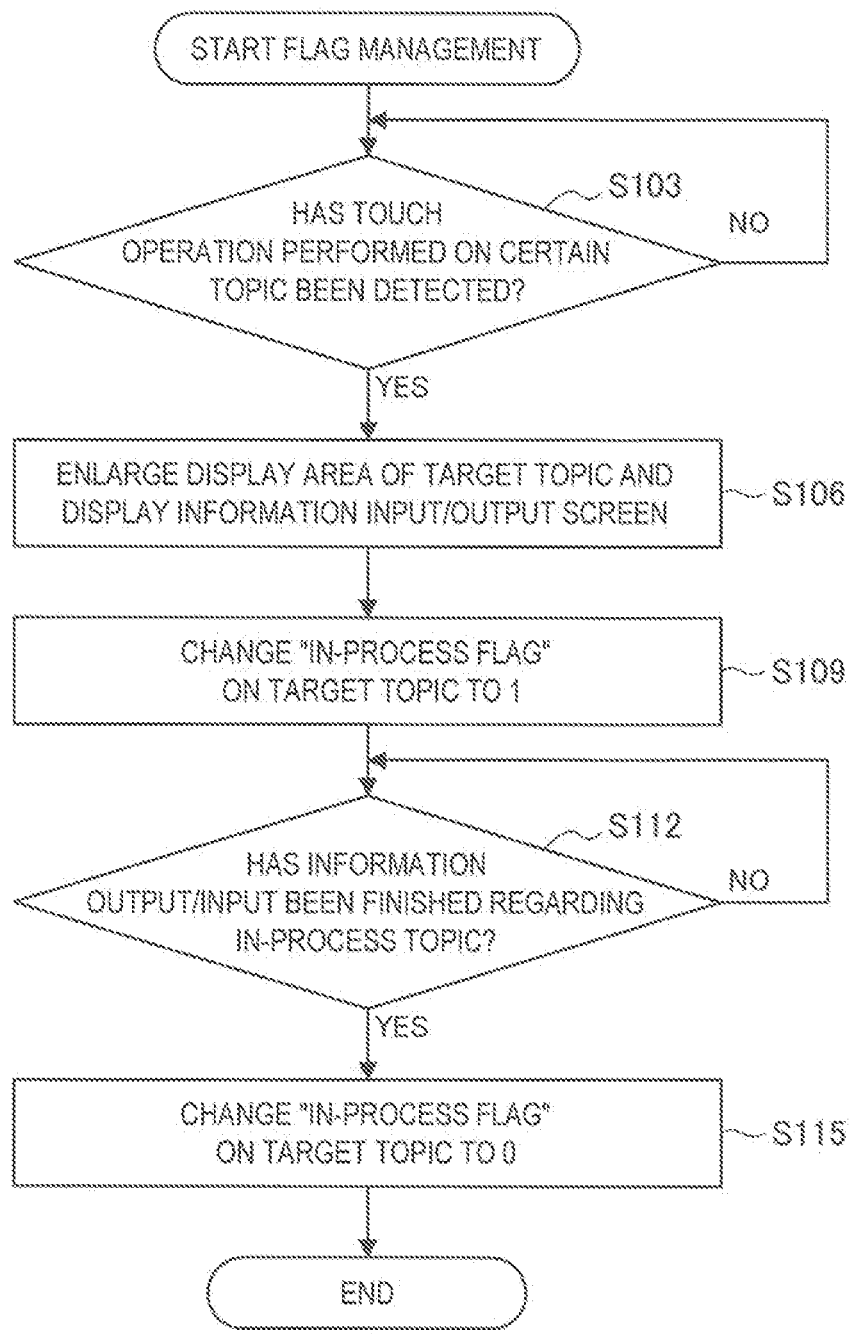
FIG. 4 is a flowchart showing flag management processing according to the embodiment.

FIG. 4 is a flowchart showing flag management processing according to the present embodiment. As shown in FIG. 4, in Step S103, the main control unit 10 first determines whether touch operation performed on any one of a plurality of topics arranged in line on the display screen has been detected from the operation input unit 13.

Subsequently, in a case where the touch operation has been detected (YES in Step S103), the display control unit 120 enlarges a display area of the target topic and displays an information input/output screen in Step S106.

Figure 7:
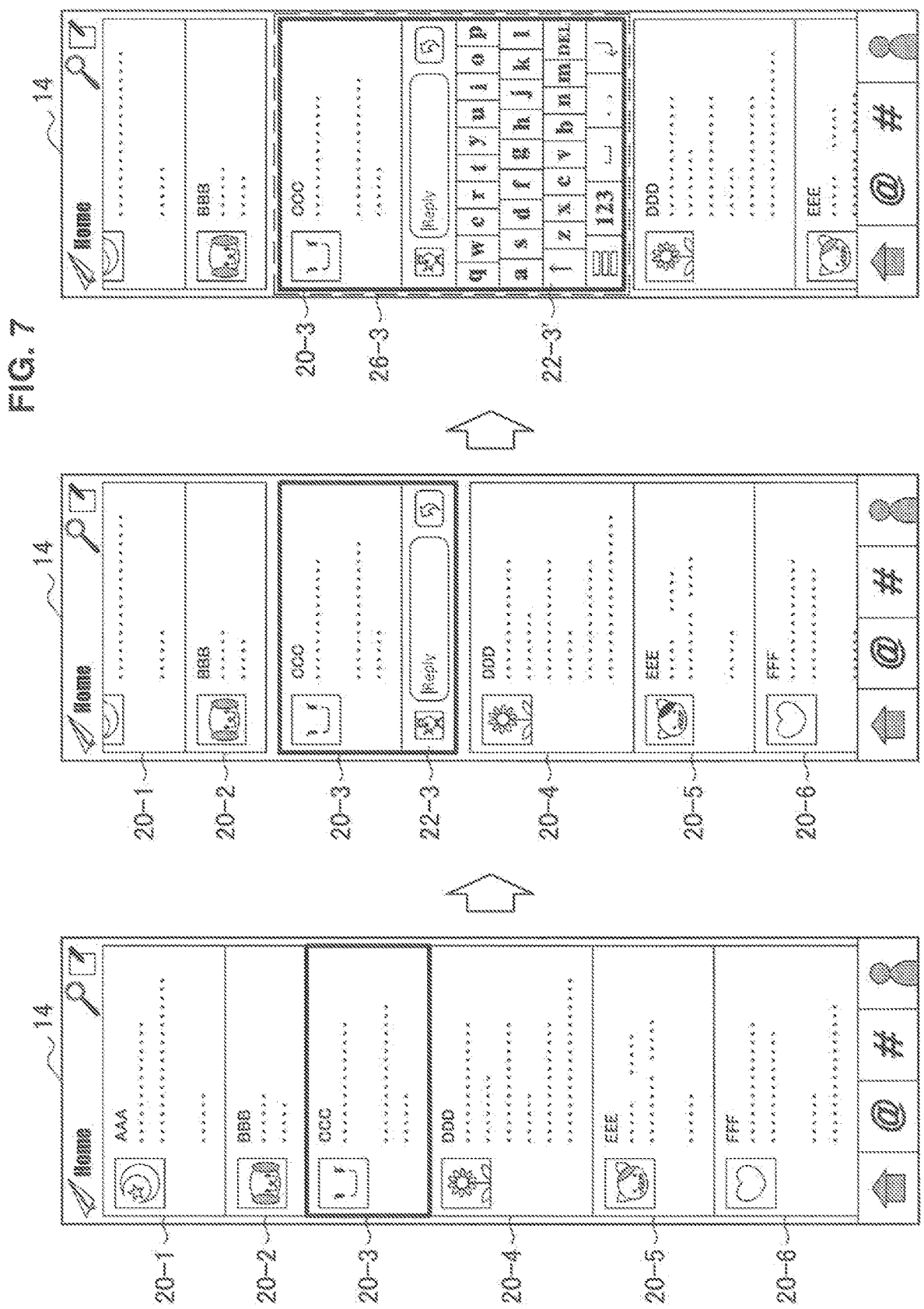
FIG. 7 is a diagram showing an example of an information input/output screen according to the embodiment.

FIG. 7 shows an example of an information input/output screen according to the present embodiment. As shown in the left-hand side of FIG. 7, for example, when a topic 20-3 is touched among topics 20-1 to 20-6 arranged in line on the display screen of the display unit 14, the display control unit 120 enlarges a display area of the topic 20-3 and displays an information input screen 22-3 as shown in the middle of FIG. 7. The information input screen 22-3 is a reply input form and is capable of replying to the target topic. When inputting reply contents, the user can tap the information input screen 22-3, cause an information input screen 22-3' including a software keyboard to be displayed as shown in the right-hand side of FIG. 7, and input texts using the software keyboard.

Subsequently, in Step S109 shown in FIG. 4, the main control unit 10 changes an "in-process flag" on the target topic in which the information input/output screen is displayed to "1" in the data stored in the content management DB 16.

Next, in Step S112, the main control unit 10 determines whether the information output/input has been finished regarding the target topic (in-process topic) in the middle of information input/output. For example, in the information input screen 22-3' shown in FIG. 7, when the reply contents has been input and a send button has been pressed, it is determined that the information input has been finished.

Subsequently, in a case where it has been determined that the information output/input has been finished (YES in Step S112), the main control unit 10 edits the data stored in the content management DB 16 in a manner that the "in-process flag" on the target topic is changed to "0" in Step S115.

The in-process flag management processing performed on the target topic according to the present embodiment has been explained so far. Next, with reference to FIG. 5, basic display-control processing according to the present embodiment is explained.

<3-2. Display Control Processing>

Figure 5:
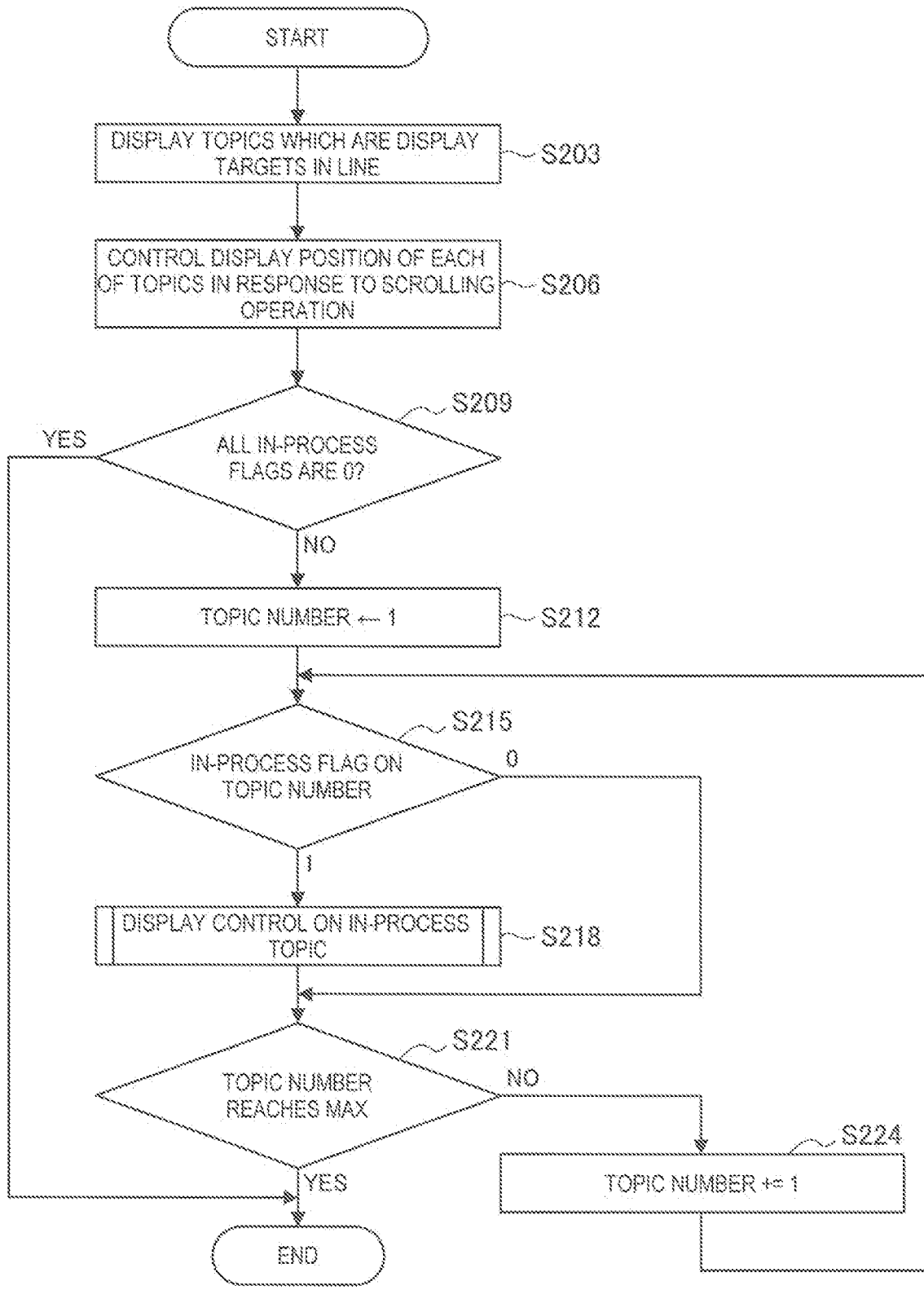
FIG. 5 is a flowchart showing basic display-control processing according to the embodiment.

FIG. 5 is a flowchart showing basic display-control processing according to the present embodiment. As shown in FIG. 5, in Step S203, the display control unit 120 first arranges and displays a plurality of topics which are display targets in line on the display unit 14.

Subsequently, in Step S206, the display control unit 120 controls (moves) a display position of each of the topics in response to scrolling operation performed on the display screen by the user. In this case, the display control unit 120 also causes a topic (in-process topic) displayed in association with the information input/output screen to be moved together with the information input/output screen.

Next, in Step S209, the main control unit 10 determines whether all "in-process flags" associated with the respective topics are "0" in the data stored in the content management DB 16.

Subsequently, in a case where it has been determined that the "in-process flags" are not all "0" (NO in Step S209), the main control unit 10 sequentially checks the "in-process flags" on the respective topics and performs certain display control on a topic whose "in-process flag" is "1" in Steps S212 to S224.

Specifically, in Step S212, the main control unit 10 substitutes "1" for a topic number (variable).

Next, in Step S215, the main control unit 10 determines whether an "in-process flag" has been set on the substituted topic number.

In a case where the "in-process flag" is "0" (0 in Step S215) (in a case where the in-process flag has not been set), the main control unit 10 determines whether the topic number has reached a MAX in Step S221.

Subsequently, in a case where the topic number has not reached the MAX (NO in Step S221), the main control unit 10 increments the topic number in Step S224 and repeats Steps S215 to S224. In this way, the main control unit 10 increments the topic number and sequentially checks an "in-process flag" on each of the topic.

Alternatively, in a case where it has been determined that the "in-process flag" is "1" in Step S215 (1 in Step S215) (in a case where the in-process flag has been set), the display control unit 120 performs certain display control on a topic (in-process topic) whose "in-process flag" is "1" in Step S218. On the other hand, the display control unit 120 scrolls a normal topic whose "in-process flag" is "0", as normal.

The basic display-control processing according to the present embodiment has been explained so far. Next, with reference to FIG. 6, display control of an in-process topic performed in Step S218 is explained in detail.

<3-3. Display Control Processing of in-Process Topic>

Figure 6:
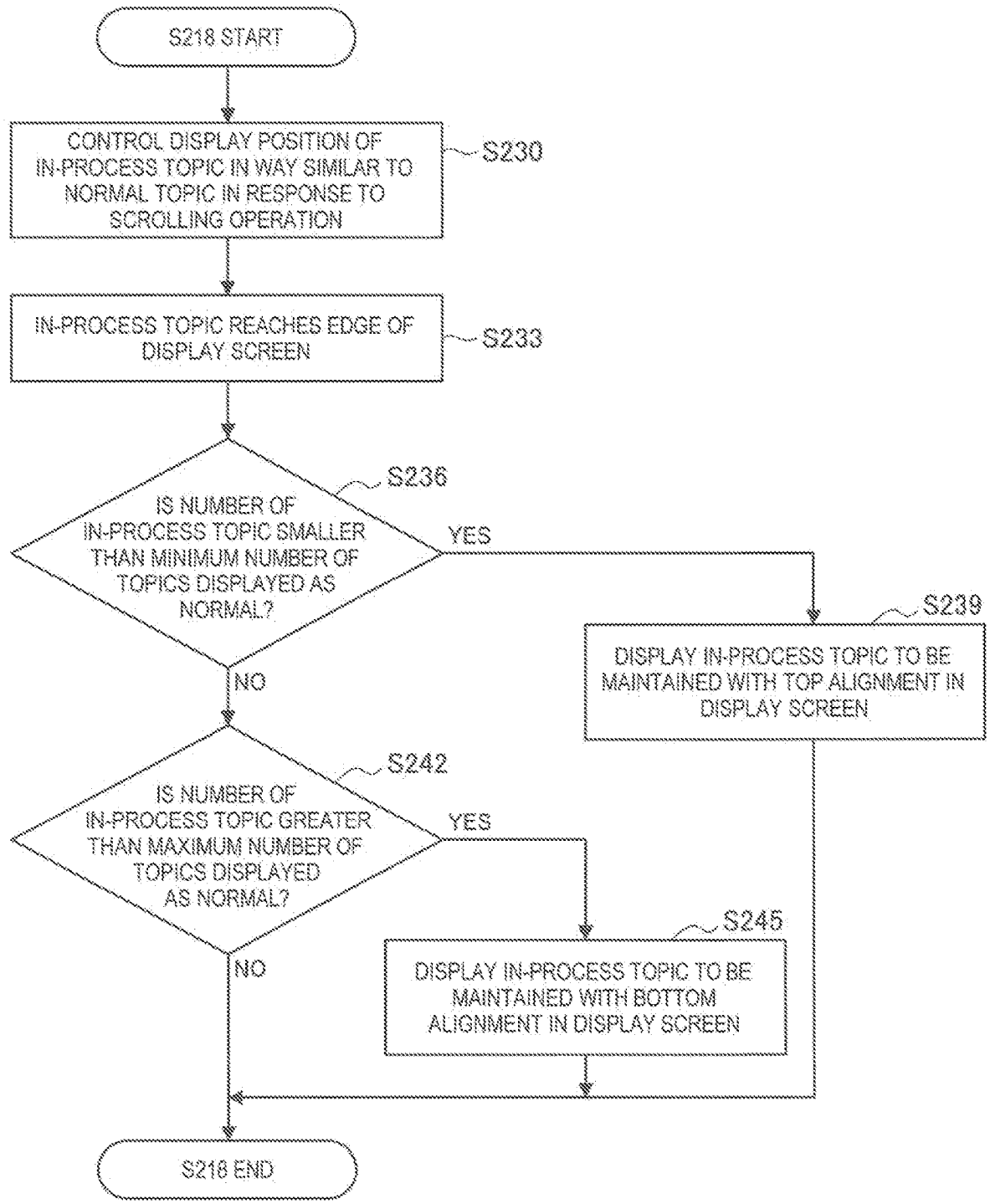
FIG. 6 is a flowchart showing display-control processing of an in-process topic according to the embodiment.
Figure 8:
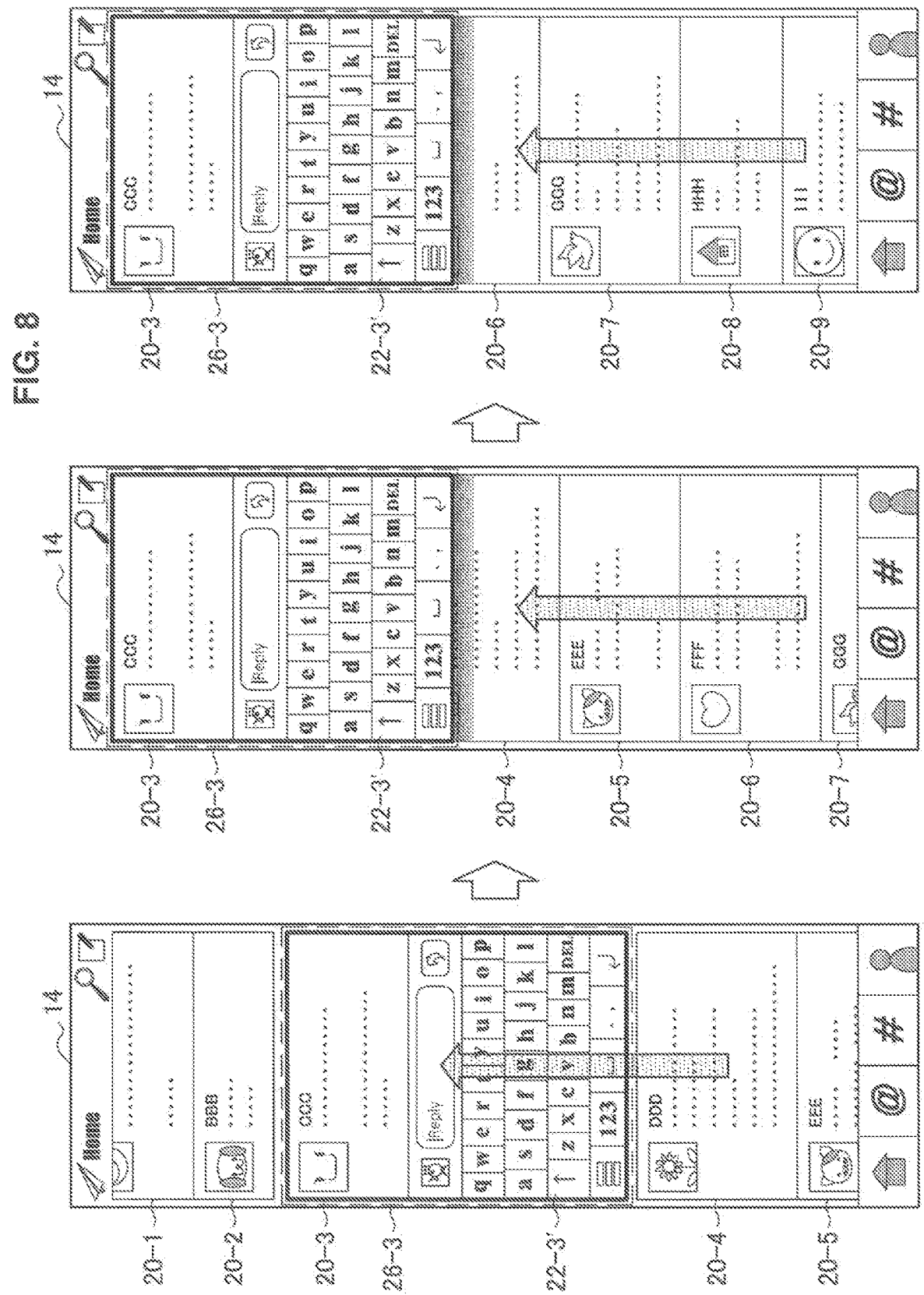
FIG. 8 is a screen-transition diagram illustrating scrolling of a display screen including an in-process topic.

FIG. 6 is a flowchart showing display-control processing of an in-process topic according to the present embodiment. As shown in FIG. 6, in Step S230, the display control unit 120 first moves a display position of an in-process topic in a way similar to the normal topic in response to scrolling operation performed by the user. FIG. 8 shows a display-transition diagram illustrating scrolling of a display screen including an in-process topic. With reference to FIG. 8, this operation processing is explained. As shown in the left-hand side of FIG. 8, the display control unit 120 first causes a display region 26-3 including a topic 20-3 and an information input screen 22-3' to be scrolled in a way similar to normal topics 20-1, 20-2, 20-4, and 20-5.

Next, in Step S233, the detection unit 110 detects that the in-process topic (topic whose in-process flag is "1") has reached an edge of the display screen. Specifically, as shown in the middle of FIG. 8, the detection unit 110 detects that the display region 26-3 including the in-process topic 20-3 has reached at a top edge of the display screen, for example.

Subsequently, in Step S236, the main control unit 10 determines whether the number of the in-process topic is smaller than the minimum number of topics displayed as normal. For example, in a display state shown in the middle of FIG. 8, it is determined that a topic number "3" of the in-process topic 20-3 is smaller than a minimum number "4" of topics displayed as normal when the topic 20-2 has been scrolled out.

Next, in a case where it has been determined that the number of the in-process topic is smaller (YES in Step S236), the display control unit 120 performs display control in a manner that the in-process topic is maintained with top alignment in the display screen in Step S239. Specifically, As shown in the middle and right-hand side of FIG. 8, the display control unit 120 causes normal topics 20-4 to 20-9 (not-in-process topics) which are not in the middle of information input/output to be scrolled up while the display region 26-3 including the in-process topic 20-3 and the information input screen 22-3' is maintained at the top edge of the display screen.

As described above, according to the present embodiment, it is possible to maintain an in-process topic displayed in association with an information input screen at a top edge of a display screen when a plurality of topics are scrolled. Accordingly, the user can restart information input without forgetting about the in-process topic and without scrolling back in a reverse direction.

Figure 9:
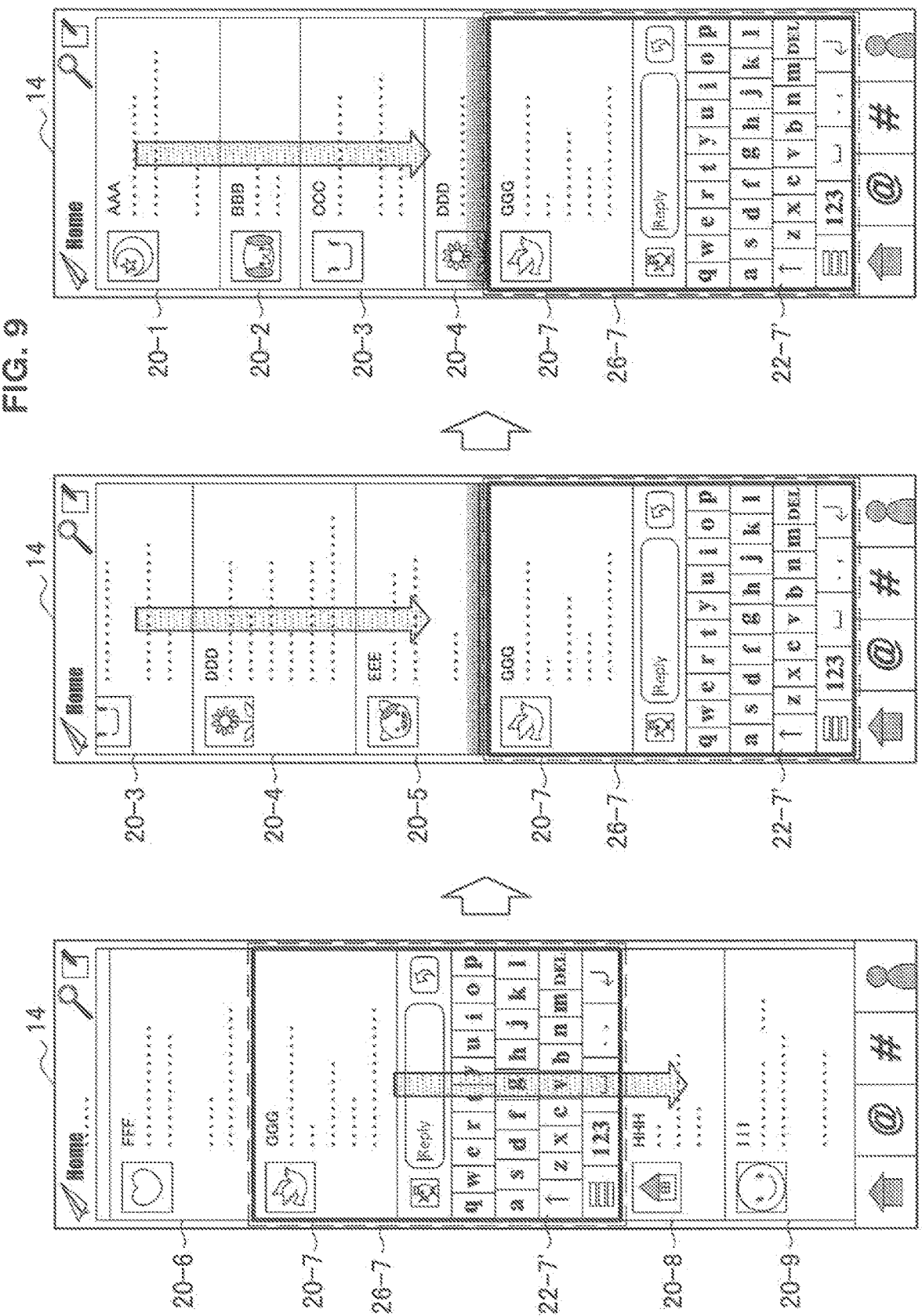
FIG. 9 is a screen-transition diagram showing display-control of an in-process topic in a case of scrolling down.

On the other hand, in a case where the number of the in-process topic is not smaller (NO in Step S236), the main control unit 10 determines whether the number of the in-process topic is greater than the maximum number of topics displayed as normal in Step S242. Here, scrolling operation performed by the user is not limited to the scrolling-up operation as shown in FIG. 8. For example, the scrolling operation may be scrolling-down operation. Hereinafter, explanation is described with reference to FIG. 9. FIG. 9 is a screen-transition diagram showing display-control of an in-process topic in a case of scrolling down.

As shown in the left-hand side and middle of FIG. 9, a plurality of topics 20-6 to 20-9 is scrolled down in response to user operation. As shown in the middle of FIG. 9, when a topic 20-8 has been scrolled out and an in-process topic 20-7 has reached a bottom edge of the display screen, it is determined that a topic number "7" of the in-process topic 20-7 is greater than a minimum number "5" of topics displayed as normal.

Next, in a case where it is determined that the number of the in-process topic is greater (YES in Step S242), the display control unit 120 performs display control in a manner that the in-process topic is maintained with bottom alignment in the display screen in Step S245. Specifically, As shown in the middle and right-hand side of FIG. 9, the display control unit 120 causes normal topics 20-1 to 20-6 (not-in-process topics) to be scrolled down while the display region 26-7 including the in-process topic 20-7 and the information input screen 22-7' is maintained at the bottom edge of the display screen, for example.

As described above, according to the present embodiment, it is possible to maintain an in-process topic displayed in association with an information input screen at a bottom edge of a display screen when a plurality of topics is scrolled. Accordingly, the user can restart information input without forgetting about the in-process topic and without scrolling back in a reverse direction.

Figure 10:
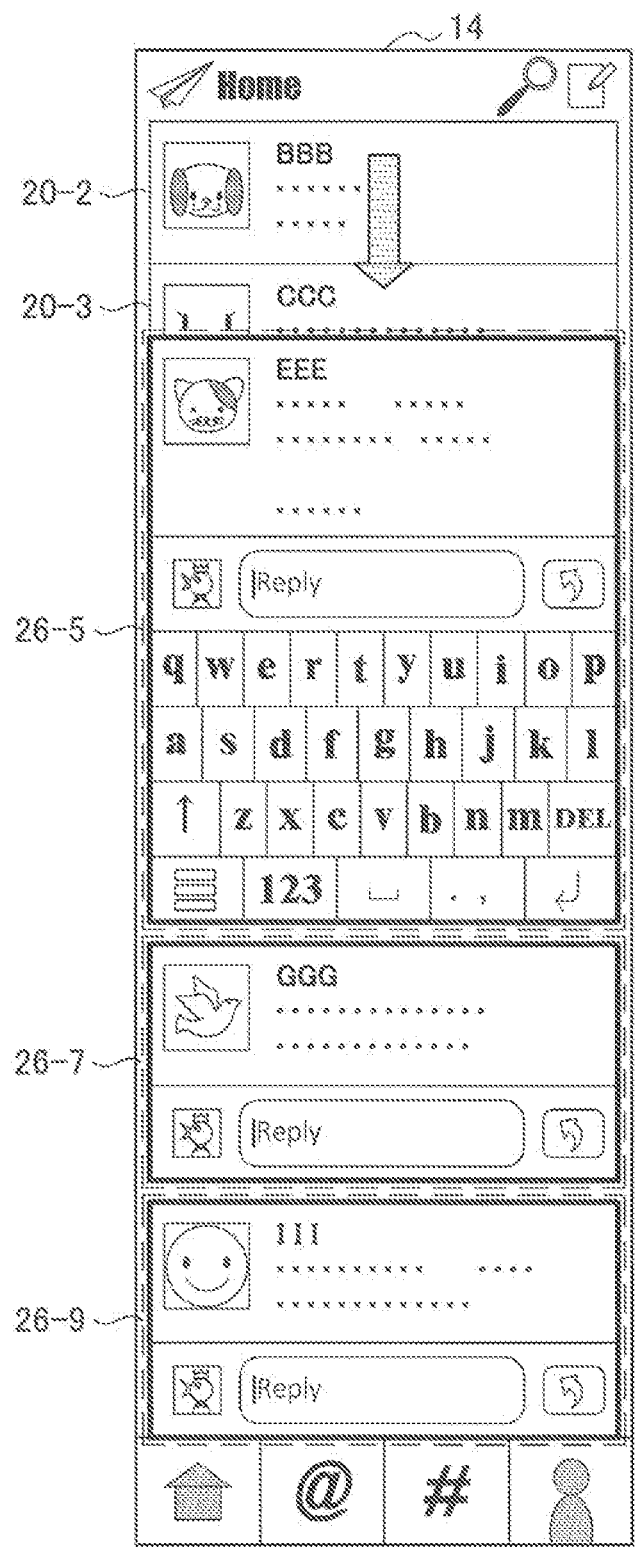
FIG. 10 is a diagram illustrating a case where a plurality of in-process topics are maintained and displayed at an edge.

The display control processing of the in-process topic according to the present embodiment has been explained in detail so far. Note that, with reference to FIGS. 8 and 9, it has been explained that the single in-process topic is maintained at the top/bottom edge of the display screen in the case where the single in-process topic has reached the top/bottom edge. However, the present embodiment is not limited thereto. It is also possible to maintain a plurality of in-process topics at the top/bottom edge in a similar way. For example, as shown in FIG. 10, the display control unit 120 may maintain a plurality of display regions 26-5, 26-7, and 26-9 each including an in-process topic with bottom alignment in a display screen. In this case, the display regions 26-5, 26-7, and 26-9 including topics having topic numbers greater than the maximum topic number "3" among the topic numbers of normal topics are maintained with bottom alignment.

In addition, after causing an in-process topic reached the top/bottom edge of the display screen by being scrolled to be maintained at the top/bottom edge, the display control unit 120 brings the maintained in-process topic back to the initial position (blank) and continues scrolling when scrolling in a reverse direction. Specifically, when the initial position (blank) of the maintained in-process topic is scrolled in, the display control unit 120 performs control in a manner that the in-process topic maintained at the top/bottom edge is scrolled together with normal topics again.

In addition, in a case where an in-process flag on the topic maintained at the edge becomes "0", the display control unit 120 performs control in a manner that the display of such topic is stopped (hidden). Specifically, in a case where playing of a video has been automatically stopped, or in a case where the user has input a stop instruction, the display control unit 120 performs control in a manner that the display of the video maintained at the edge of the display screen is stopped (hidden) substantially at the same time of the stop instruction or after elapse of a certain time.

(Modification)

Next, a modification of the display control of the in-process topic according to the present embodiment is explained. As shown in FIG. 1, the above-described embodiment shows an example that a plurality of topics are arranged in line on the longitudinal display unit 14 having the aspect ratio of substantially 3:1 (27:9). In this case, as shown in FIGS. 8 and 9 for example, the in-process topic maintained at the top/bottom edge of the display screen is overlaid and displayed on normal topics. Moreover, as shown in FIG. 10, a display region of normal topics becomes narrower when the plurality of topics is maintained at the edge of the display screen.

Accordingly, in a modification of the embodiment, a column of a plurality of topics to be scroll-displayed and a column of in-process topics maintained in the display screen are maintained in parallel in a wide-width display unit 14' having an aspect ratio of substantially 4:3. Hereinafter, detailed explanation is described with reference to FIGS. 11 to 12.

Figure 11:
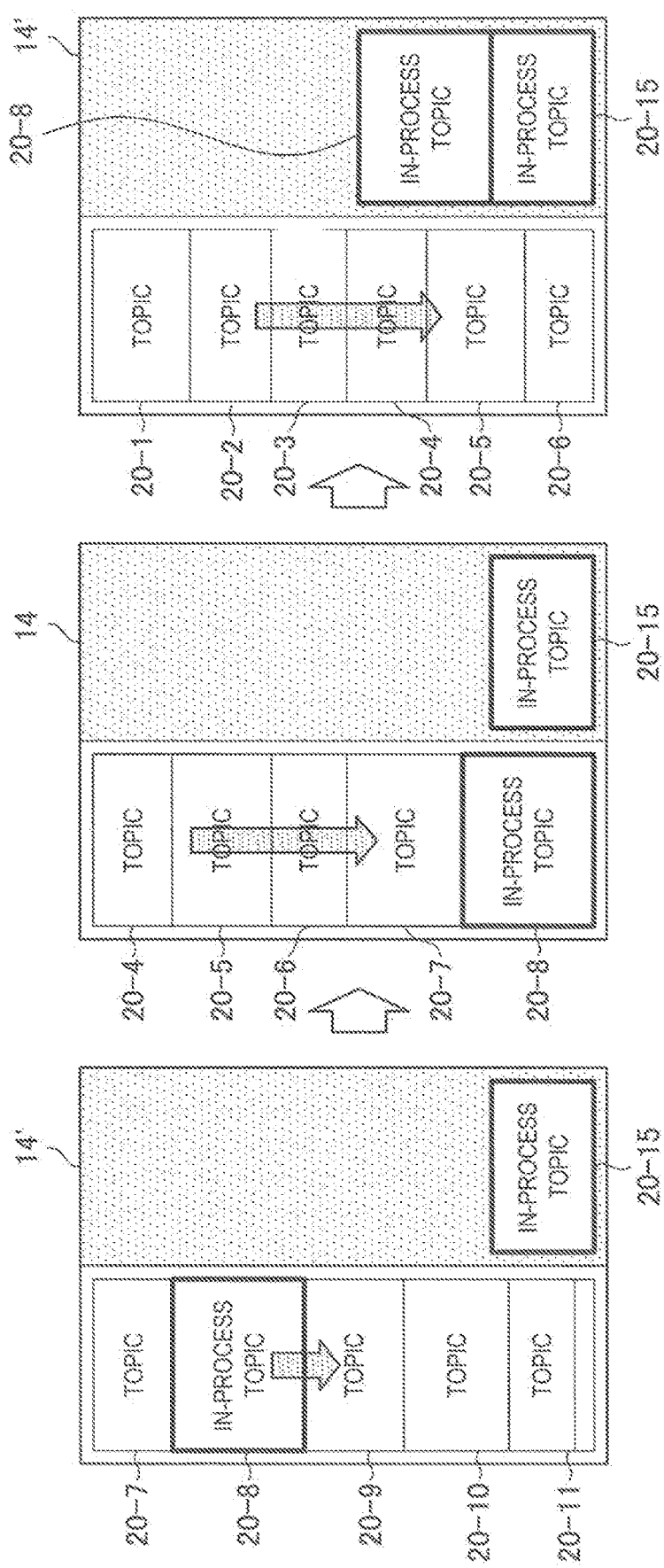
FIG. 11 is a screen-transition diagram illustrating a display example of in-process topics according to a modification of the embodiment.

FIG. 11 is a screen-transition diagram illustrating a display example of in-process topics according to a modification of the embodiment. As shown in FIG. 11, the display unit 14' according to the modification of the present embodiment includes a wide-width display screen having the aspect ratio of substantially 4:3. In addition, as shown in the left-hand side of FIG. 11, the display unit 14' includes a region where a plurality of topics 20-7 to 20-11 are arranged in line and a region where an in-process topic 20-15 is maintained.

Display positions of the topics 20-7 to 20-11 arranged in line are moved in response to scrolling operation performed by the user, and are sequentially scrolled out. However, as shown in the middle of FIG. 11, when an in-process topic 20-8 has been moved in response to the scrolling operation and has reached an edge of the display screen, the display control unit 120 maintains the in-process topic 20-8 with bottom alignment so as to be parallel to the column of the normal topics as shown in the right-hand side of FIG. 11.

As described above, according to the modification, it is possible to parallelly display a column in which a plurality of topics is scrolled and a column in which in-process topics reached an edge of a display screen by being scrolled are maintained in the display screen. In this way, the plurality of in-process topics can be maintained in the display screen without being overlaid on the column of normal topics. Moreover, the normal topics can be displayed without being hidden by the in-process topics.

Figure 12:
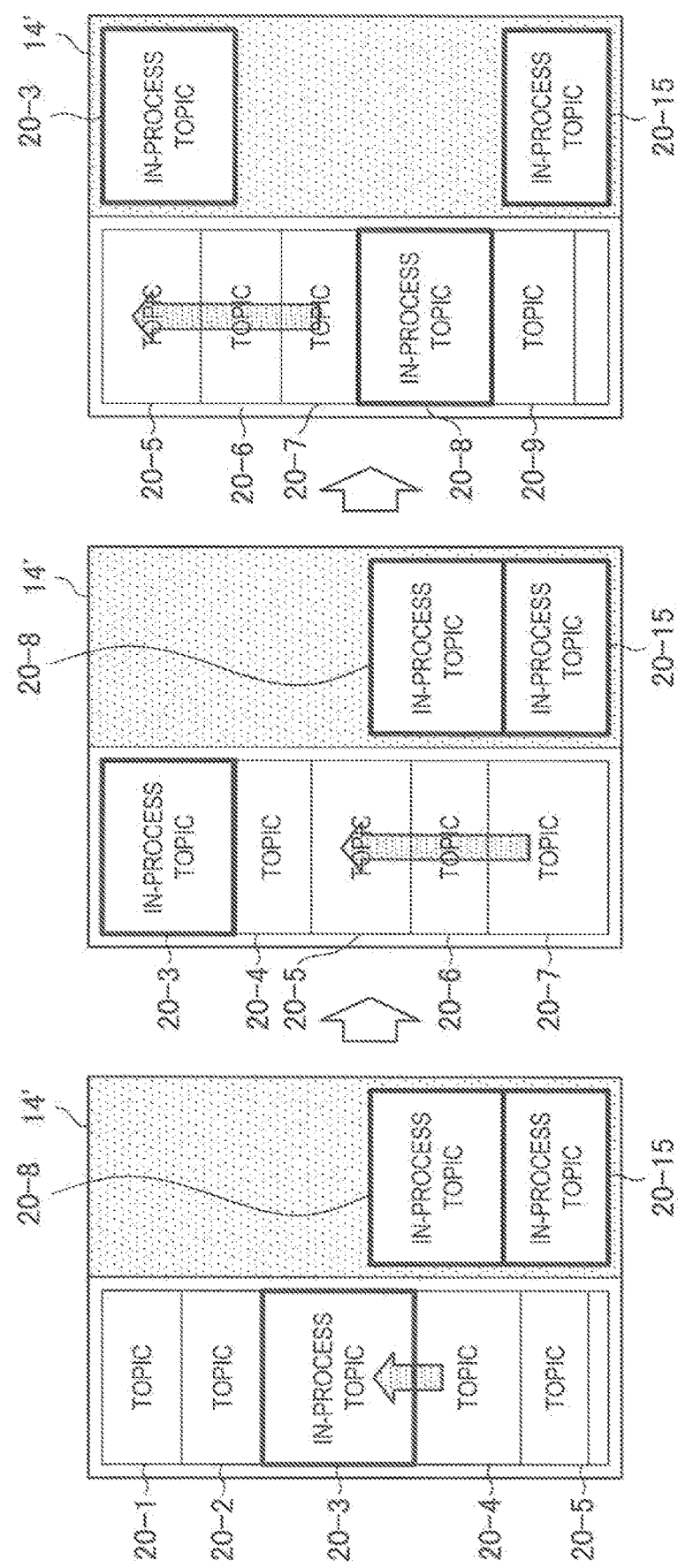
FIG. 12 is a screen-transition diagram illustrating a display-control example of returning an in-process topic to a column according to a modification of the embodiment.

Next, with reference to FIG. 12, there is described display control of returning an in-process topic maintained in a display screen to a column of normal topics. FIG. 12 is a screen-transition diagram illustrating a display-control example of returning an in-process topic to a column according to a modification of the embodiment.

First, as shown in the left-hand side of FIG. 12, a plurality of topics 20-1 to 20-5, and in-process topics 20-8 and 20-15 are parallelly arranged and displayed in line on the display unit 14. In addition, among the plurality of topics 20-1 to 20-5, the topic 20-3 is an in-process topic.

Next, as shown in the middle of FIG. 12, when the topics 20-1 to 20-5 are scrolled up, the normal topics 20-1 and 20-2 are sequentially scrolled out. Subsequently, when the in-process topics 20-3 have reached the top edge, the display control unit 120 performs control in a manner that the in-process topic 20-3 is maintained within the display screen.

Specifically, as shown in the right-hand side of FIG. 12, the display control unit 120 takes the in-process topic 20-3 out of the column in which topics are scroll-displayed, and displays the in-process topic 20-3 to be maintained with top alignment. In addition, when the topics are scrolled up, the display control unit 120 brings the in-process topic 20-8 maintained with bottom alignment back to an initial position in the column and causes the in-process topic 20-8 to be scrolled up. Specifically, as shown in the middle of FIG. 12, in a case where the topics 20-6 and 20-7 are sequentially scrolled in from the bottom edge and then are scrolled up, the display control unit 120 brings the topic 20-8 maintained with bottom alignment back to the column at a time when a position (blank) where the topic 20-8 was initially displayed is scrolled in from the bottom edge. Next, as shown in the right-hand side of FIG. 12, the topic 20-8 brought back to the column is scrolled up in a way similar to the other normal topics 20-5 to 20-7 and 20-9.

4. DISPLAY CONTROL OF IN-PROCESS VIDEO

As an example, the above-described embodiment discloses that display control is performed in a manner that an in-process topic in the middle of information input is not scrolled out, but is maintained at a prescribed position in a display screen in a case where a plurality of topics (such as headlines of articles and posts) is arranged in line. The display control of in-process content according to the present embodiment is not limited to the above-described display control of a topic in the middle of information input. It is also possible to perform display control on a video embedded in an article in a similar way and to maintain the in-process video in the middle of playing in the display screen. Hereinafter, detailed explanation is described with reference to FIGS. 13 to 16.

<4-1. Outline>

Display control of an in-process video may be performed by the information processing device 1 explained with reference to FIG. 1. Since the configuration of the information processing device 1 has been described with reference to FIG. 2, repeated explanation is omitted here. Note that, in the content management DB 16, videos (including an inline video embedded in an article) arranged in line in a display screen are managed by using identification numbers (hereinafter, also referred to as video numbers). FIG. 13 shows a configuration example of a video management database stored in the content management DB 16. As shown in FIG. 13, each video is managed with a video number, and is associated with a link to detailed contents of the video and an in-process flag. Here, the "in-process flag" is set on a video in the middle of playing (in the middle of information output).

<4-2. Operation Processing>

Figure 14:
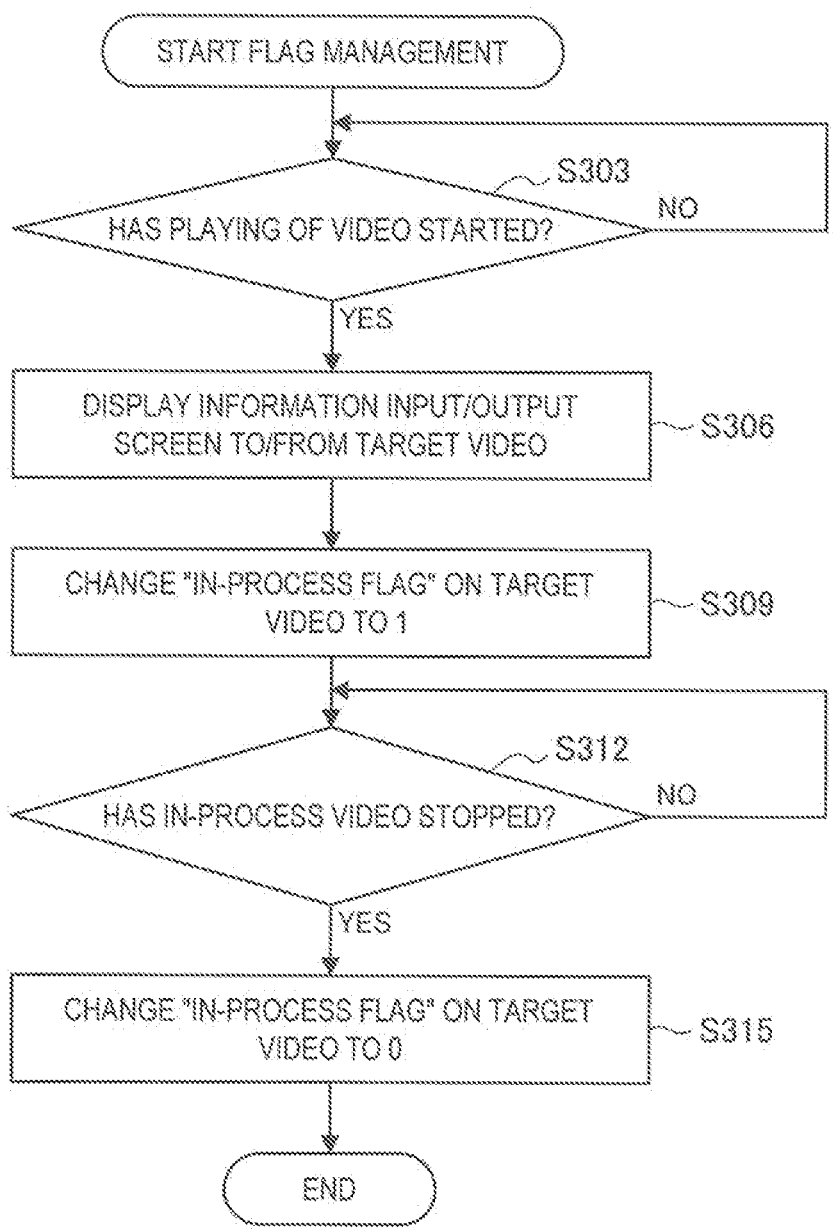
FIG. 14 is a flowchart showing management processing of an in-process flag of video content.
Figure 15:
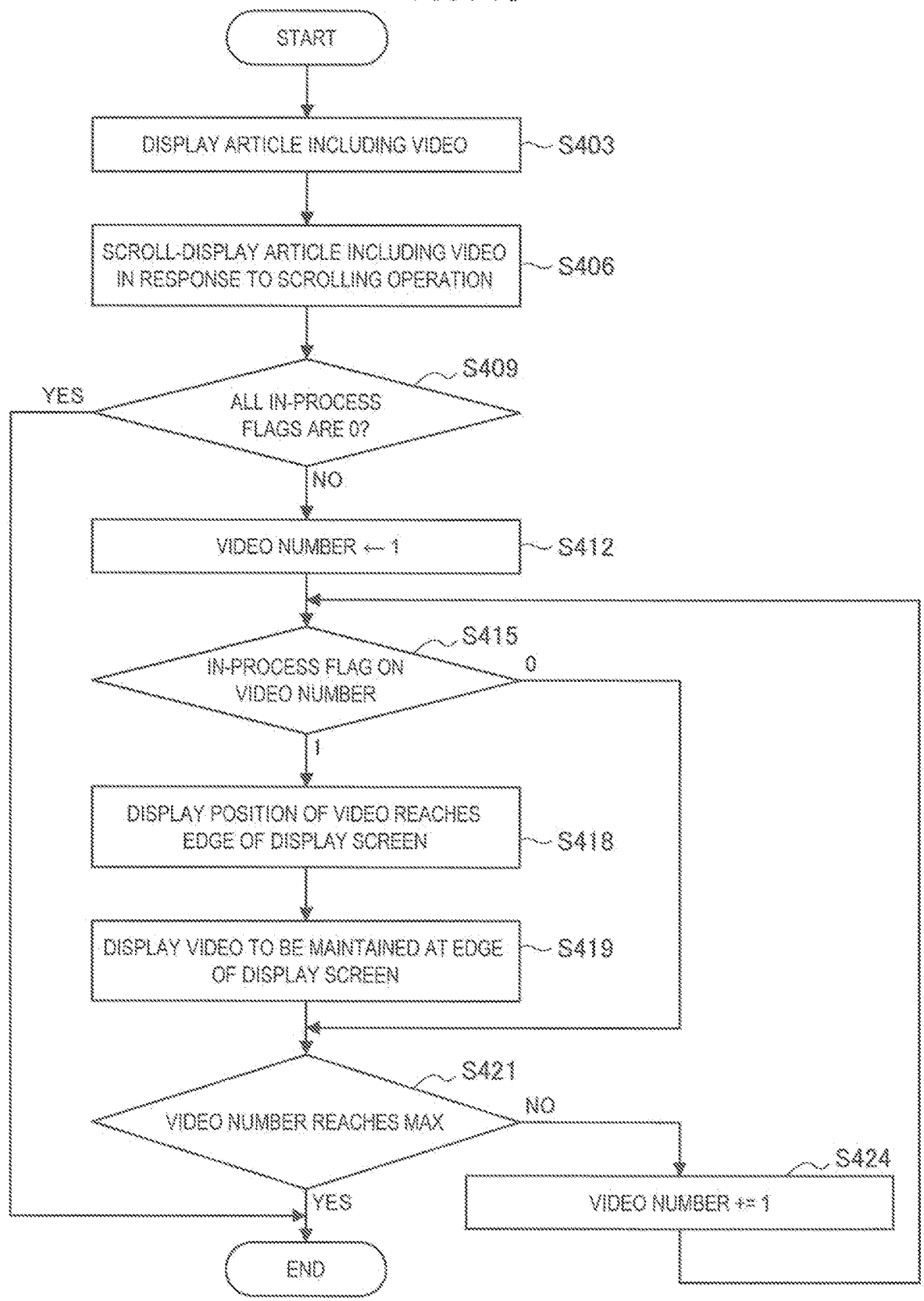
FIG. 15 is a flowchart showing display-control processing of an in-process video.

Next, with reference to FIGS. 14 to 16, operation processing relating to display control of an in-process video is explained.

(Flag Management Processing)

FIG. 14 is a flowchart showing management processing of an in-process flag on video content. As shown in FIG. 14, in Step S303, the main control unit 10 first determines whether an instruction to start to play a video is issued, the video being embedded and displayed in an article displayed in a display screen. Specifically, the main control unit 10 determines that the instruction to start to play the video has been issued when user operation such as tapping the inline video has been detected from the operation input unit 13.

Subsequently, in a case where it has been determined that video reproduction has been started (YES in Step S303), the display control unit 120 displays an information input/output screen to/from a target video in Step S306. Specifically, the display control unit 120 displays, in association with the target video, a video play screen (an example of the information output screen), and an operation screen (an example of the information input screen) for performing play, stop, fast forward, rewind, and slow on the video.

Subsequently, in Step S309, the main control unit 10 changes an "in-process flag" on the target video for which the information input/output screen is displayed to "1" in the data stored in the content management DB 16.

Next, in Step S312, the main control unit 10 determines whether the playing of the target video (in-process video) in the middle of playing ends (is stopped). Specifically, it is determined that the playing has been stopped in a case where the playing of the target video has automatically ended or in a case where the user has pressed a stop button, for example.

Subsequently, in a case where it has been determined that the playing has been stopped (YES in Step S312), the main control unit 10 edits the data stored in the content management DB 16 in a manner that the "in-process flag" on the target video becomes "0" in Step S315.

The in-process flag management processing performed on the target video according to the present embodiment has been described so far. Next, with reference to FIG. 15, basic display-control processing according to the present embodiment is explained.

(Display Control Processing)

FIG. 15 is a flowchart showing display-control processing of an in-process video. As shown in FIG. 15, in Step S403, the display control unit 120 first displays an article in which a video is embedded on the display unit 14.

Next, in Step S406, the display control unit 120 controls (moves) a display position of the article including the video in response to scrolling operation performed on the display screen by the user. Here, FIG. 16 shows a scroll-display example of the article including the video. As shown in the left-hand side of FIG. 16, the display control unit 120 moves up an article including a video 28-1 and displayed on the display unit 14 in response to scroll-up operation performed by the user, for example. As shown in FIG. 16, the video 28-1 is an in-process video in the middle of playing.

Next, in Step S409, the main control unit 10 determines whether all "in-process flags" associated with respective videos are "0" in the data stored in the content management DB 16.

Subsequently, in a case where it has been determined that the "in-process flags" are not all "0" (NO in Step S409), the main control unit 10 sequentially checks the "in-process flags" on the respective videos and performs certain display control on a video whose "in-process flag" is "1" in Steps S412 to S424.

Specifically, in Step S412, the main control unit 10 substitutes "1" for a video number (variable).

Next, in Step S415, the main control unit 10 determines whether an "in-process flag" has been set on the substituted video number. In a case where the "in-process flag" is "0" (0 in Step S415), the main control unit 10 determines whether the video number has reached a MAX in Step S421.

Subsequently, in a case where the video number has not reached the MAX (NO in Step S421), the main control unit 10 increments the video number in Step S424 and repeats Steps S415 to S424. In this way, the main control unit 10 increments the video number and sequentially checks an "in-process flag" on each of the video.

Alternatively, in a case where it has been determined that the "in-process flag" is "1" in Step S415 (1 in Step S415) (in a case where the in-process flag has been set), the detection unit 110 detects that the in-process video (video whose in-process flag is "1") has reached an edge of the display screen in Step S418. Specifically, in the example shown in FIG. 16, the detection unit 110 detects that the video 28-1 in the middle of playing has reached the top edge of the display screen, for example.

Next, in Step S419, the display control unit 120 performs display control in a manner that the in-process video reached the edge of the display screen is maintained at the edge of the display screen. Here, FIG. 16 shows a display-transition diagram illustrating a display example of scrolling of an article including an in-process video. As shown in FIG. 16, for example, the display control unit 120 performs display control in a manner that the video 28-1 is not scrolled out from the display screen and is maintained at the top edge of the display screen, the video being in the middle of playing and being scrolled up together with the article. In addition, in response to scrolling operation performed by the user, the display control unit 120 moves up another article and an article including a normal video 28-2 (not-in-process video) which is not in the middle of playing, and performs display control in a manner that such articles are scrolled out as normal.

As described above, according to the present embodiment, when articles including videos are scrolled, it is possible to scroll, as normal, another article and a video which is not in the middle of playing while maintaining an in-process video in the middle of playing at an edge of a display screen. Accordingly, the user can view the video in the middle of playing without forgetting about the video in the middle of playing and without scrolling back in a reverse direction.

The display control of the in-process video according to the present embodiment has been explained in detail so far. Note that, in a case where the video 28-2 displayed in the light-hand side of FIG. 16 is also in the middle of playing (is an in-process video), the display control unit 120 can perform display control in a manner that the video 28-2 is also maintained in the display screen with top alignment.

In addition, in a case where an in-process flag on the video maintained at the edge becomes "0", the display control unit 120 performs control in a manner that the display of such video is stopped (hidden). Specifically, for example, in a case where playing of a video has been automatically stopped, or in a case where the user has input a stop instruction, the display control unit 120 performs control in a manner that the display of the video maintained at the edge of the display screen is stopped (hidden) substantially at the same time of the stop instruction or after elapse of a certain time.

4. CONCLUSION

As described above, the information processing device 1 according to the embodiments of the present disclosure can maintain a topic in the middle of information input/output at a prescribed position in a display screen together with an information input/output screen, when a screen in which topics such as articles and posts are arranged and displayed in line is scrolled. Accordingly, the user can immediately restart operation without forgetting about the topic in the middle of information input/output and without scrolling back the screen in a reverse direction.

In addition, in the present embodiments, it is also possible that topics that are not in the middle of information input/output are scrolled as normal in response to user operation while a topic in the middle of information input/output and an information input/output screen are maintained at a prescribed position in a display screen. For example, in the present embodiments, it is possible to maintain a video in the middle of information input/output (for example, video in the middle of playing) at a prescribed position in a display screen together with an information input/output screen (for example, operation input screen for playing, stopping, and fast forwarding) when a screen where an article in which the video is embedded is displayed is scrolled.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, a computer program for causing hardware, such as the CPU, ROM and RAM built into the information processing device 1 to exhibit functions of the information processing device 1 can be created. Further, a computer-readable storage medium on which this computer program is recorded can also be provided In addition, the advantageous effects described in the specification are merely explanatory or illustrative, and are not limited. In other words, the technology according to the present disclosure can exert other advantageous effects that are clear to those skilled in the art from the description of the specification, in addition to or instead of the advantageous effects described above.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) A display control device including:

a detection unit configured to detect that an information input or output screen is scrolled together with scrolling of a plurality of content regions, the information input or output screen being related to a content region provided adjacent to a single content region among the plurality of content regions arranged and displayed in line on a display screen, and configured to detect that the information input or output screen has reached a prescribed position on the display screen; and a display control unit configured to, when the detection unit has detected that the information input or output screen has reached the prescribed position, perform display control in a manner that the information input or output screen is maintained at the prescribed position, and configured to perform display control in a manner that scrolling of the plurality of content regions continues.

(2) The display control device according to (1), wherein the detection unit detects that the information input or output screen has reached an edge of the display screen which is the prescribed position.

(3) The display control device according to (1) or (2), wherein the display control unit performs display control in a manner that the information input or output screen is maintained at the prescribed position together with the adjacent content region.

(4) The display control device according to any one of (1) to (3),
wherein the display control unit performs control in a manner that display of the information output screen stops when information output by the information output screen ends.
(5) The display control device according to (4),
wherein the display control unit performs control in a manner that display of the information output screen stops after a predetermined time has elapsed after information output by the information output screen has ended.
(6) The display control device according to any one of (1) to (3),
wherein the display control unit performs control in a manner that display of the information input screen stops when information input through the information input screen ends.
(7) The display control device according to any one of (1) to (3),
wherein the display control unit performs control in a manner that display on the information input or output screen stops when user operation instructs to end information input or output to or from the information input or output screen.
(8) The display control device according to any one of (1) to (7),
wherein the display control unit performs control in a manner that scrolling of the information input or output screen and a corresponding content region restarts when an initial position of the content region is scrolled in, the content region being adjacent to the information input or output screen which is maintained at the prescribed position in a column where the scrolling continues.
(9) A non-transitory computer-readable storage medium having a program stored therein, the program causing a computer to function as:
a detection unit configured to detect that an information input or output screen is scrolled together with scrolling of a plurality of content regions, the information input or output screen being related to a content region provided adjacent to a single content region among the plurality of content regions arranged and displayed in line on a display screen, and configured to detect that the information input or output screen has reached a prescribed position on the display screen; and
a display control unit configured to, when the detection unit has detected that the information input or output screen has reached the prescribed position, perform display control in a manner that the information input or output screen is maintained at the prescribed position, and configured to perform display control in a manner that scrolling of the plurality of content regions continues.

What is claimed is:
1. A display control device, comprising:
a Central Processing Unit (CPU) configured to:
control a display screen to display a plurality of content regions, wherein
the plurality of content regions comprises a first content region and at least one second content region displayed in line on the display screen, and
the first content region includes video content;
select the first content region based on a first user input;
control the display screen to enlarge the first content region based on the selection of the first content region,
wherein the enlarged first content region is displayed concurrently with the at least one second content region on the display screen;
detect a first scroll of the plurality of content regions on the display screen;
determine that the enlarged first content region has reached a specific position on the display screen based on the first scroll; and
control the display screen to:
maintain the enlarged first content region at the specific position based on the determination, such that the at least one second content region of the plurality of content regions is continued to be scrolled on the display screen based on the first scroll;
continuously play the video content in the enlarged first content region concurrently with the first scroll of the at least one second content region; and
stop the display of the first content region based on elapse of a threshold time from an end of the play of the video content.
2. The display control device according to claim 1, wherein the specific position comprises an edge of the display screen.
3. The display control device according to claim 1, wherein the CPU is further configured to control the display screen to stop the display of the first content region based on a second user input.
4. The display control device according to claim 1, wherein the CPU is further configured to control the display screen to stop the display of the first content region based on a user operation to end at least one of information input to the display screen or information output from the display screen.
5. The display control device according to claim 1, wherein the CPU is further configured to:
detect a second scroll of an initial position of the first content region; and
control the display screen to restart the first scroll of the first content region based on the detection of the second scroll.
6. A non-transitory computer-readable medium having stored thereon, computer-executable instructions, which when executed by a CPU, cause the CPU to execute operations, the operations comprising:
controlling a display screen to display a plurality of content regions, wherein
the plurality of content regions comprises a first content region and at least one second content region displayed in line on the display screen, and
the first content region includes video content;
selecting the first content region based on a first user input;
controlling the display screen to enlarge the first content region based on the selection of the first content region,
wherein the enlarged first content region is displayed concurrently with the at least one second content region on the display screen;
detecting a first scroll of the plurality of content regions;
determining that the enlarged first content region has reached a specific position on the display screen based on the first scroll; and
controlling the display screen to:
maintain the enlarged first content region at the specific position based on the determination, such that the at least one second content region of the plurality of content regions is continued to be scrolled based on the first scroll;

continuously play the video content in the enlarged first content region concurrently with the first scroll of the at least one second content region; and stop the display of the first content region based on elapse of a threshold time from an end of the play of the video content.

7. The display control device according to claim 1, wherein the plurality of content regions comprises a third content region that corresponds to an in-process region, the CPU is further configured to display at least one of a display region or an information input screen as part of the in-process region, the display region is configured to display content of the third content region, and the information input screen is configured to display at least one of an input form or a software keyboard.

\* \* \* \* \*